July 28, 1925. 1,547,743
E. R. FOWLER
CARRIER DISTRIBUTING APPARATUS FOR CARRIER DISPATCH SYSTEMS
Filed Aug. 14, 1922 2 Sheets-Sheet 1
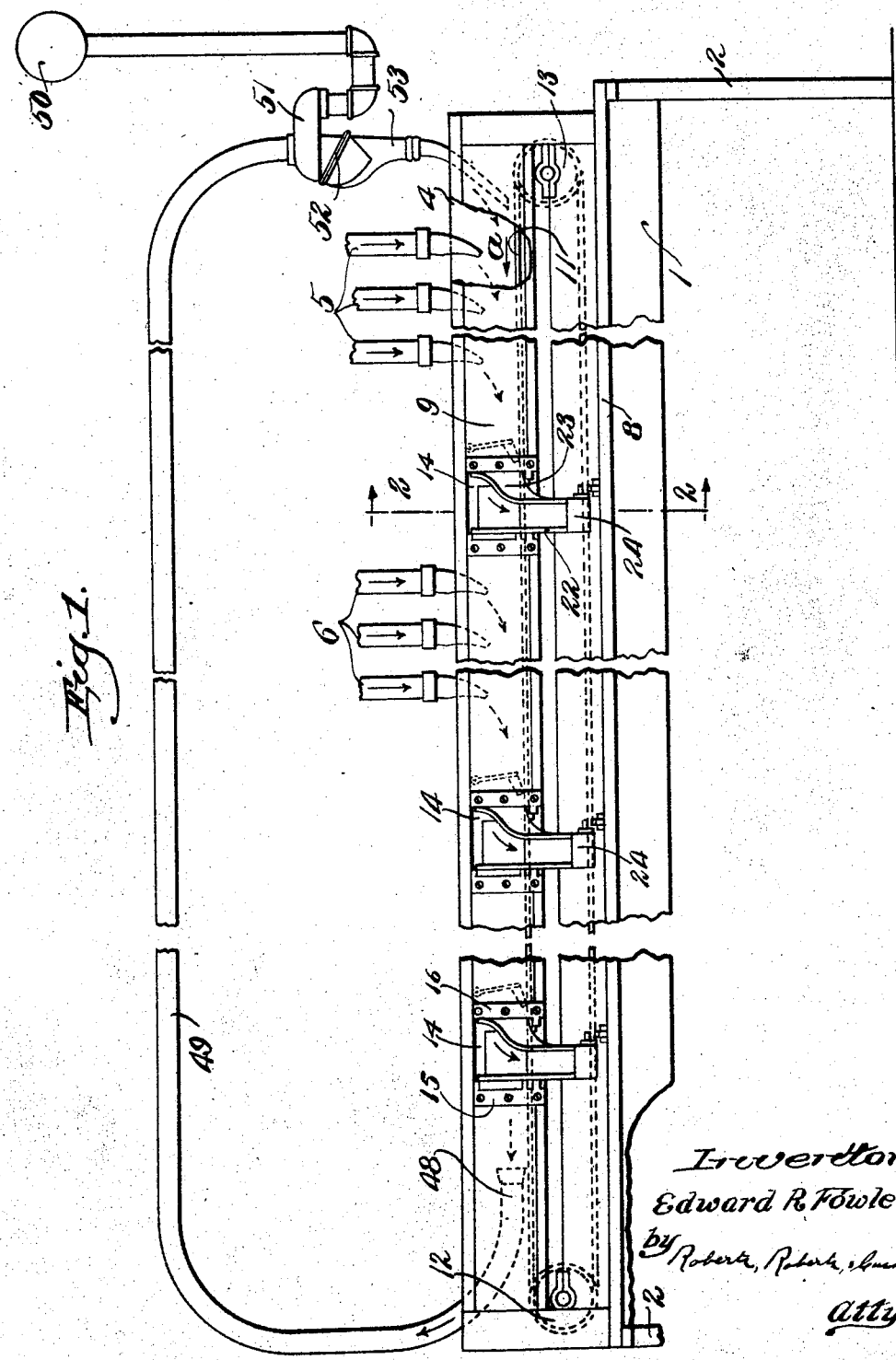

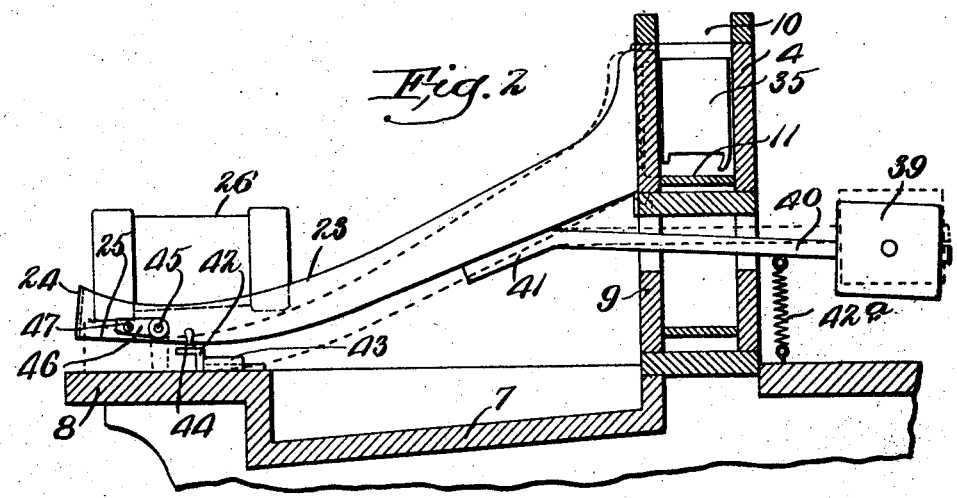

Patented July 28, 1925.

1,547,743

UNITED STATES PATENT OFFICE.

EDWARD R. FOWLER, OF HAVERHILL, MASSACHUSETTS, ASSIGNOR TO THE LAMSON COMPANY, OF BOSTON, MASSACHUSETTS, A CORPORATION OF MASSACHUSETTS.

CARRIER-DISTRIBUTING APPARATUS FOR CARRIER-DISPATCH SYSTEMS.

Application filed August 14, 1922. Serial No. 581,664.

*To all whom it may concern:*

Be it known that I, EDWARD R. FOWLER, a citizen of the United States of America, and resident of Haverhill, in the county of Essex and State of Massachusetts, have invented new and useful Improvements in Carrier-Distributing Apparatus for Carrier-Dispatch Systems, of which the following is a specification.

This invention pertains to carrier dispatch systems and more particularly to carrier distributing means for the central station of such a system.

In accordance with modern practice all of the carriers arriving at the central station from the outlying substations move along a common path from which they are diverted to the operators' stations by means of suitable manually controlled deflectors. An instance of such an arrangement is disclosed in the patent to Whittier, No. 1,365,428, January 11, 1921, wherein an endless belt is shown as the means for moving the carriers. Whether or not a belt or some other arrangement is employed for causing the carriers to move along the desired path, it is found occasionally that distributing the arriving carriers by the manual operation of the several deflectors is inadequate to produce an equal apportionment of work among the operators in accordance with their individual capacities. For example, during unusual activity in one department of the store or other establishment served by the system, carriers may be delivered so rapidly through one set of tubes at the central station that the operators adjacent thereto are unable to handle them with the desired promptness while other operators may have little or nothing to do. This situation has made it necessary in emergencies for the supervisors at the central station to distribute carriers by hand among the various operators, but this is unsatisfactory as the apportionment so made is, at best, very uneven, and the attention of the supervisor is thus distracted from more important duties.

Essential desiderata in a commercially acceptable central station apparatus are that arriving carriers be returned substantially in the order of their arrival and with a minimum delay. The principal objects of the present invention are, accordingly, to provide for the automatic distribution of carriers arriving at the central station among the several operators in accordance with the individual capacity of the operators to perform the necessary transactions and substantially in accordance with the order of arrival of the carriers, and without reference to the rate of arrival of carriers through any particular group or groups of delivery terminals. Further objects are to provide for optionally stopping the automatic delivery of carriers at any operator's station or the continuous delivery of all carriers at a single station if desired. With these objects in view, this invention provides for delivering the carriers to each individual operator as fast and no faster than that operator picks up successive carriers for completing the necessary transaction. One preferred way of doing this is to cause carriers from a stream moving past the operators' stations to be diverted into pivotally supported and counterbalanced chutes or receptacles arranged before the several operators, the tilting of each receptacle under the weight of a predetermined number of carriers, preferably a single one, automatically closing a gate preventing the entrance of additional carriers into that chute or receptacle until the receptacle has been relieved of a substantial portion of the weight of such predetermined number of carriers previously admitted thereto. The counterbalance then restores the receptacle to normal position and opens the gate to permit another carrier to enter the receptacle, whereupon the operation is repeated. By locking a receptacle either in its lower or upper position, the automatic distribution of carriers may be terminated, and the delivery of carriers to the corresponding operator's station either may be entirely stopped, or all carriers emerging from the delivery terminals to one side of said station may be delivered at that station, in accordance with the position in which the receptacle is held. Guard means are preferably provided for preventing closing or opening of the gate while a carrier is passing the entrance to the receptacle in order to avoid jamming the gate.

The invention further comprises the provision of means for maintaining all of the received carriers which have not been distributed to an operator in circulation in a substantially closed path within the central station until they have been distributed to an operator. For example, a conveyor of suitable type is provided for returning the undiverted carriers remaining in the stream of carriers after passing all of the operators, to the other end of the central station desk, where they are again delivered into the stream of carriers flowing past the operators' stations. Arriving carriers are thus continuously circulated unless and until they are delivered to an operator.

In its broader aspects the invention is entirely independent of the means employed for moving the carriers past the operator's stations or of the character of conveyor employed for returning undelivered carriers to the starting point, or of the particular automatic means for apportioning the carriers among the various operators' stations, and it is contemplated that the invention will be applied to central station apparatus of any type wherein carriers are distributed among several operators' stations from a common stream or source.

In the accompanying drawings one instance of a desirable arrangement of the automatic distributing device of the present invention has been shown by way of example, these devices being illustrated as applied to a central station apparatus of the type disclosed in the patent to Whittier above referred to, and comprising a pneumatic suction tube for returning undelivered carriers to the starting point.

In the drawings:—

Fig. 1 is a side elevation of one side of a central station apparatus of well known type having the present invention applied thereto, certain parts being broken away;

Fig. 2 is a fragmentary vertical cross section to larger scale on a line such as 2—2 of Fig. 1;

Fig. 3 is a fragmentary plan view of certain of the parts shown in Fig. 2;

Fig. 4 is a fragmentary vertical cross section on the line 4—4 of Fig. 3;

Fig. 5 is a fragmentary vertical cross section on the line 5—5 of Fig. 4; and

Fig. 6 is a fragmentary plan view showing details of the means for connecting the movable receptacle with the gate member.

The central station desk, indicated generally by the numeral 1, is mounted upon suitable supports 2. A member 4 extends upwardly from the desk and serves to support the delivery ends of banks of pneumatic transmission tubes 5, 6 respectively. The desk is provided with a depressed portion 7 for the reception of the cash boxes or other appurtenances of the apparatus and is preferably provided with a substantially horizontal ledge or table 8 at its forward edge. A panel 9 rises vertically from the rear edge of the portion 7 of the desk and is spaced from the member 4 to provide a trough 10 whose bottom is defined by the upper run of an endless belt 11. This belt passes over pulleys 12, 13 at the opposite ends of the desk respectively and is constantly driven in the direction of the arrow $a$ in Fig. 1. The vertical panel 9 is provided at intervals with openings 14 substantially opposite the several operators' stations. The vertical edges of these openings are reinforced by frame members 15, 16 respectively, suitably secured to the panel 9. Lugs 17, 18 (Fig. 4) project inwardly from the frame members 15, 16 at their lower ends, and these lugs are furnished with V notches 19, 19$^a$ in their upper surfaces. These notches serve as fulcrums for knife edge members 20, 20$^a$ respectively projecting downwardly from the lower wall 21 of a receptacle or chute of trough-like form having the side walls 22 and 23. The bottom wall 21 of the receptacle or chute is inclined for the greater part of its length from the plane of the belt 11 toward the table 8 and its lower end is closed by a plate 24. The lower portion of the bottom wall 21 of the receptacle or chute is substantially horizontal as indicated at 25 providing a support upon which a carrier, as indicated at 26 in Fig. 2, may rest in convenient position for removal by the operator.

A pair of ears 27, 28 project inwardly from the frame member 15, and these ears are furnished with aligned journal openings for the reception of a shaft 29. A deflector or gate member 30 is secured to the shaft 29 and turns freely about the axis of the shaft. This deflector or gate member is preferably provided with a concave inner surface 31 and a convex outer surface 32 and is of such length that when occupying the full line position of Fig. 3 it extends across the width of the trough 10 and when occupying the dotted line position of said figure it substantially closes the entrance to the receptacle or chute. The rear portions of the walls 22 and 23 are extended upwardly as shown at 22$^a$, 23$^a$, substantially to the top of the opening 14 and the portion 22$^a$ of the wall 22 is furnished with one or more gear teeth 33 (see Fig. 6). These gear teeth mesh with teeth 34 carried by a collar adjustably secured to the shaft 29 by a set screw 34$^a$, the arrangement being such that movement of the receptacle or chute about its fulcrum causes the deflector or gate member to swing about the axis of shaft 29.

A baffle plate 35 is suspended from its upper edge upon a horizontal pivot pin 36 within the trough 10 and above the belt 11 in such position that carriers moving along upon the belt and approaching the entrance to the chute must pass beneath the deflector, causing the latter to swing about its axis. The deflector is provided with a pair of fingers 37, 38 projecting from its lower edge, the finger 37 being longer than the finger 38. These fingers are arranged to contact respectively with the concave and convex surfaces of the gate or deflector for locking such gate or deflector in fully open or fully closed position in order to prevent the jamming of a carrier between the edge of the gate and adjacent parts.

The forward portion of the chute is counterbalanced by means of a weight 39 adjustably supported upon an arm 40 passing through suitable openings in the members 4 and 9 and secured at 41 to the bottom wall 21 of the chute. To assist the counterweight 39 in holding the chute in normal position a spring such as 42ª may be provided, or if desired the counterweight may be dispensed with and an adjustably tensioned spring substituted therefor. The latter arrangement has the advantage that the moving mass is less so that the sensitiveness of the device and its rapidity of action are increased.

A latch or bolt 42 is mounted to slide in a housing 43 carried by the table 8 and this bolt is provided with an overhanging shoulder 44 at its forward end. This shoulder may be caused to engage a pin 45 projecting laterally from the side wall of the chute or receptacle so as to lock the latter in its lowermost position, indicated in dotted lines in Fig. 2. The pin 45 also constitutes a pivot upon which a stop member 46 is supported. This member is provided with a handle 47 by means of which it may be swung down into the dotted line position shown in Fig. 2, wherein it serves to hold the chute in its upper full line position.

At the left-hand side of the desk as viewed in Fig. 1, that is the end toward which the stream of carriers is moved by belt 11, the receiving end 48 of a pneumatic suction tube 49 is arranged within the trough 10 and adjacent to the upper run of the belt 11 so that any carriers moving along the belt at this point are automatically drawn into the tube and carried to the opposite end of the desk. The tube 49 is of usual type and is connected to a vacuum trunk or drum 50 and is provided with the terminal 51 controlled by an automatic valve 52. From this terminal the carriers passing through the tube are delivered into a chute 53 which dumps them onto the belt 11 which again moves them past the operators' stations.

The device operates generally as follows: Carriers arriving through the several tubes 5, 6 drop onto the upper run of the belt 11 and are caused to move longitudinally past the several operators' stations. Each of the several chutes or receptacles normally occupies the position shown in full lines in Fig. 2 and in this position the corresponding deflector 30 stands transversely across the trough 10 so that a carrier moving along the chute passes beneath the baffle 35 lifting the latter and causing the finger 37 to engage the inner surface of the gate 30, thus holding the latter against movement. The carrier now strikes the concave surface 31 of the deflector and is swept from the belt out through the aperture 14 and onto the inclined surface 21 of the chute or receptacle along which it slides until it strikes the end closure 24 when it comes to rest. When the carrier passes from beneath the baffle, the latter drops to normal vertical position and as the carrier comes to rest in the lower part of the chute the latter swings downwardly about its fulcrum, thus causing the deflector 30 to move to the dotted line position of Fig. 3, closing the entrance to the chute or receptacle and preventing succeeding carriers from entering the same. A succeeding carrier traveling with belt 11 must then move on until it reaches a deflector occupying normal position across the trough 10 when the carrier will enter the corresponding chute or receptacle whereupon its deflector is moved to inoperative position in the same manner as above described. It is thus clear that but a single carrier can ordinarily be admitted at the same time to one of the chutes or receptacles as the admission of a single carrier immediately closes the gate or deflector and prevents the admission of another carrier. When the operator removes the carrier from the lower part of the chute or receptacle the counterweight 39 immediately tends to restore such chute or receptacle to its normal elevated position, at the same time swinging the corresponding deflector across the trough 10 ready for the admission of another carrier. If a carrier should be passing the entrance to the chute at the instant the operator removes a carrier from the chute, the baffle member 35 being raised by the passing carrier prevents the deflector 30 from moving, as its finger 38 engages the convex side of the deflector, so that the chute remains in its lower position until the carrier is safely past the deflector, whereupon the baffle drops to normal position and the counterweight is again free to restore the chute and deflector to normal position.

The relation of each deflector to its corresponding receptacle may be varied as desired by adjusting the collar having the gear teeth 34 relatively to the shaft 29, so that the parts may always be maintained in proper operative condition. The counterbalance weight 39 may also be adjusted to hold the receptacle in proper normal position, and while normally this weight is so adjusted as to permit the receptacle to descend under the weight of a single carrier, it is evident that by properly adjusting the weight or substituting a heavier one, the receptacle may be made to respond only to the presence of two or more carriers.

As it is possible with the above arrangement for carriers to pass all of the operators' stations without being diverted from their normal path of movement, the return conveyor comprising the tube 49 is provided and by this means any such undelivered carriers are restored to the stream and again circulated past the several operators. The arrangement thus provides for automatically apportioning the carriers among the several operators in exact accordance with their individual capacity for transacting the desired operations, since a carrier is delivered to an operator only when the last proceeding carrier has been lifted from the receptacle for performing the desired transaction.

While as herein illustrated the chute or receptacle is mounted upon a knife edge fulcrum it is contemplated that other means may well be employed for pivotally supporting the receptacle and in the same way it is evident that other and more sensitive means than that shown may if desired be employed for supporting the deflector member 30. If for any reason during the operation of the device it should become expedient to discontinue the delivery of carriers at one of the operators' stations, this may readily be accomplished by depressing and locking the receptacle in its lower position by means of the bolt 42. Similarly if the automatic selection of carriers is to be dispensed with for any reason the chute or receptacle may be retained in its upper position by means of the stop member 46 which is then swung down until its lower end contacts with the upper surface of the table 8 so that the receptacle will be held in its upper position in which case all carriers moving along upon the belt to the right of this receptacle (as viewed in Fig. 1) will pass down into the receptacle. Such an arrangement might be desirable in case the volume of business became so small that a single operator stationed at the left-hand end of the desk, as viewed in Fig. 1, could care for all of the necessary transactions. Although shown as applied to a desk having a belt conveyor for moving the carriers past the operators' stations, it is evident that the present invention is equally applicable to central station apparatus of other types, for example in which the carriers are caused to travel by some other means, and it will also be clear that in place of the pneumatic tube conveyor 49 a belt or other suitable means might be substituted; and that while but one side of the central station desk is herein shown as provided with the automatic distributing means, similar means could be applied to both sides of the desk if desired.

While the improved distributing means forming the subject matter of the present invention has for convenience and clarity of description been illustrated and described as embodied in the central station apparatus of a pneumatic dispatch system, it is evident that it is not necessarily confined to such specific use but that it may find a broad field of utility in conveyor apparatus in general. The term "carrier" as employed herein is to be understood in a generic sense as embracing containers of any description as well as packages or in fact any portable article which it is desired to move from place to place, while the term "central station desk" is also employed merely for convenience as designating some definite and predetermined portion of the conveyor system at which the distribution of carriers takes place. So also the term "operators' station," while conveniently indicating one of the points at which carriers are delivered to an operator is to be understood as illustrative merely of any such delivery point and as embracing any definite part of the conveyor system at which carriers are diverted from the main stream of moving carriers and either brought to rest or delivered to other conveyor means. Similarly the term "receptacle" used to designate the pivoted chutes into which the carriers are derived is not intended as a restrictive expression but to include any element adapted to receive and support the weight or a portion of the weight of a carrier either momentarily or indefinitely and to be moved by the carrier passing thereover or coming to rest thereon.

Although the weight of a diverted carrier is utilized in the preferred apparatus above described as the means for actuating the gate or deflector, it is contemplated that other and equivalent means all within the scope of the following claims, may be provided for moving the gate or deflector, such means in all cases being set into action by the delivery of a carrier or carriers at the operator's station.

What I claim and desire to secure by Letters Patent of the United States is:

1. A carrier dispatch system comprising a central station having a plurality of delivery terminals, means for moving carriers received from said terminals in a predetermined path, an operator's station adjacent to said path, and automatic means for diverting carriers from said path and bringing them to rest in a position within reach of the hand of an operator at said station, said means being inoperative so long as a previously diverted carrier remains in said position.

2. A conveyor system comprising means for moving elongate cylindrical carriers in a predetermined substantially horizontal path with their axes substantially horizontal, and means actuable by the weight of a carrier for determining the diversion of carriers from said path.

3. A conveyor system comprising means for moving carriers in a predetermined substantially horizontal path, means for diverting carriers from said path, and means actuated by a previously diverted carrier for rendering said diverting means inoperative.

4. A carrier dispatch system comprising a central station having carrier delivery terminals means for moving carriers delivered by said terminals in a predetermined path, an operator's station adjacent to said path, and automatic means for delivering carriers moving along said path into a receptacle at the operator's station, the parts being constructed and arranged to prevent the delivery of further carriers to the receptacle until a previous one has been removed therefrom.

5. Apparatus of the class described having automatic means for determining the delivery of carriers at a predetermined point comprising a lever of which one arm is in the form of a trough-like receptacle, and a second lever actuated by tilting of said first lever about its axis under the weight of a carrier in said receptacle for determining the delivery of further carriers into said receptacle.

6. A conveyor system having a guideway along which carriers are caused to move, a movable deflector for diverting carriers from said guideway, and means for moving said deflector to and from operative position comprising a movable carrier actuated member forming a support for carriers as they are diverted from the guideway.

7. A carrier dispatch system having a trough-like guideway, said guideway having an aperture in its wall, a deflector for causing carriers moving along the guideway to emerge through said opening, and means for controlling said deflector comprising an element movable by a carrier as it emerges from the opening.

8. A carrier dispatch system comprising a central station apparatus having a guideway for moving carriers, an operator's station adjacent to said guideway, a pivotally mounted and counter-balanced support arranged adjacent to the guideway at the operator's station, movable means normally operative to cause carriers moving along said guideway to debouch onto said support, and means connecting said movable means with the support so constructed and arranged that tilting of the support under the weight of a carrier renders such movable means inoperative.

9. A carrier dispatch system comprising a central station desk having means for moving carriers in a predetermined path, a movable deflector for diverting carriers from said path, a lever device having a carrier supporting arm forming a support for carriers diverted by the deflector, and connections between the deflector and said lever device so constructed and arranged that upon tilting of the lever device under the weight of a carrier the deflector is rendered inoperative.

10. A carrier dispatch system having a guideway for moving carriers, deflector means normally operative to cause carriers to debouch from the guideway, a pivotally supported receptacle for receiving carriers as they emerge from the guideway, and means connecting said receptacle with said deflector means so constructed and arranged that movement of the receptacle under the weight of a predetermined number of carriers renders said deflector means inoperative.

11. A carrier dispatch system comprising a central station apparatus having a guideway for moving carriers, a pivoted deflector for diverting carriers from the guideway, a trough-like receptacle for receiving carriers debouching from the guideway, means for pivotally supporting and balancing said receptacle, and connections between the receptacle and deflector for swinging the latter to inoperative position upon tilting of the receptacle under the weight of a carrier.

12. A carrier dispatch system comprising a central station apparatus having a guideway for moving carriers, a trough-like receptacle pivotally supported at one end adjacent to the guideway and inclining downwardly and away therefrom, a counter-balance for said receptacle, movable means for diverting carriers from the guideway into the upper end of the receptacle and connections between the receptacle and said movable means for moving the latter to inoperative position as the receptacle tilts under the weight of a carrier.

13. Apparatus of the class described comprising an elongate guideway for carriers, an elongate movable support pivoted adjacent to one side of said guideway to swing about a horizontal axis, means for counterbalancing said support, a deflector device normally extending across said guideway but movable into a position where it extends across the upper end of said support, and connections between the support and deflector device for moving the latter into such last named position upon downward tilting of the support under the weight of a carrier.

14. A carrier dispatch system comprising a central station having a desk provided with a guideway for moving carriers, a trough-like member arranged substantially at right angles to said guideway and pivotally supported adjacent thereto, spring means for counterbalancing said member, a deflector device pivotally mounted adjacent to one side of said guideway and normally extending across such guideway for deflecting carriers into said trough-like member, and means connecting said member and deflector for swinging such deflector to inoperative position upon tilting of the trough-like member under the weight of a carrier.

15. A carrier dispatch system comprising a central station apparatus having a trough-like guideway for moving carriers, said guideway having an opening in its side wall, an elongate receptacle pivotally supported at one end adjacent to said guideway and having its bottom wall inclined downwardly and outwardly from the lower part of the opening, means for balancing said receptacle about its pivotal support, a deflector pivotally mounted adjacent to one side of said opening, and engaging elements carried by the deflector and receptacle respectively for swinging the deflector into substantial alignment with the apertured wall of the guideway upon downward tilting of the receptacle under the weight of a carrier therein.

16. A central station apparatus comprising means for guiding carriers in a predetermined path, a trough-like receptacle pivoted adjacent to one side of said path and extending downwardly and away therefrom, said receptacle having a closure at its lower end, means for counterbalancing the receptacle comprising an adjustable weight and a spring, a deflector pivoted to turn about an axis adjacent to one side of said path and elements carried by the receptacle and deflector respectively constructed and arranged to move the deflector to inoperative position under the weight of a carrier resting in the lower end of such receptacle.

17. Apparatus of the class described comprising a trough-like guideway for carriers having an aperture in its side wall, a trough-like receptacle comprising a bottom wall and side-walls, such receptacle being pivoted to turn about a horizontal axis adjacent the lower edge of such aperture, a deflector device arranged adjacent to said aperture and normally extending transversely across said guideway, and intermeshing gear teeth connecting said receptacle with said deflector constructed and arranged to move the deflector across said aperture upon downward movement of the receptacle under the weight of a carrier.

18. Apparatus of the class described comprising a guideway for carriers, said guideway having a lateral egress opening, a deflector arranged alternatively to close said opening or to divert carriers therethrough, automatic means for moving said deflector, and a pivotally mounted member normally projecting into the path of carriers moving in the guideway and constructed and arranged to be moved by an approaching carrier whereby to lock the deflector against movement.

19. Apparatus of the class described comprising a guideway for moving carriers having a lateral egress opening, a pivoted deflector device arranged alternatively to obstruct said opening or to extend transversely across said guideway for diverting carriers into said opening, automatic means for moving the deflector, and automatic means actuable by an approaching carrier for preventing movement of said deflector device from one of said positions to the other while said carrier is in the path of movement of the deflector.

20. Apparatus of the class described comprising a guideway for carriers, said guideway having a lateral egress opening and movable deflector means associated with said opening for diverting carriers therethrough, and a baffle device arranged within said guideway and spaced from said opening in the direction of the approach of carriers along the guideway, said baffle device being constructed and arranged automatically to lock the deflector device in either operative or inoperative position while a carrier is passing from said baffle device to the deflector device.

21. Apparatus of the class described comprising a guideway for carriers, said guideway having an aperture for the discharge of carriers, a movable element alternatively operative to close said aperture or to divert carriers therethrough, automatic means for moving said device, a baffle arranged within the guideway to swing freely about a horizontal axis adjacent to its upper edge, said baffle normally hanging in the path of approaching carriers and being swung upwardly thereby, and means associated with said baffle for locking the deflector means against movement when such baffle is moved by an approaching carrier.

22. Apparatus of the class described comprising a trough-like guideway for carriers, said guideway having an aperture in one of its side walls, movable means operative alternatively for closing said aperture or for deflecting carriers therethrough, a plate arranged within said guideway to swing freely about a horizontal axis, and a pair of fingers projecting from the lower edge of said plate constructed and arranged respectively to engage said deflector device in either its operative or inoperative position as such plate is moved by an approaching carrier.

23. Apparatus of the class described comprising a guideway for carriers, automatically controlled means for determining the delivery of carriers from said guideway, and a manually actuable device whereby the automatic action of said means may be terminated.

24. Apparatus of the class described comprising a guideway for carriers and a receptacle extending laterally from said guideway, means for supporting said receptacle to swing about a horizontal axis, means controlled by the swinging of the receptacle under the weight of a carrier therein for closing the entrance to the receptacle, and manually actuable means for preventing movement of the receptacle.

25. Apparatus of the class described comprising means providing a path for moving carriers, an inclined trough-like receptacle extending laterally from said path, an automatically actuable deflector normally positioned to divert carriers from said path into said receptacle, and manually actuable means for locking said deflecting means in such normal position.

26. Apparatus of the class described comprising a guideway for carriers having an operator's station adjacent thereto, a pivotally supported trough-like receptacle extending from said guideway at the operator's station, means for deflecting carriers from the guideway into said receptacle, connections between the receptacle and deflecting means for transmitting movement of the former to the latter, and manually actuable means for optionally preventing downward movement of the receptacle under the weight of a carrier.

27. Apparatus of the class described comprising a guideway for carriers and an operator's station adjacent to said guideway, automatic means for delivering carriers from the guideway to said station in accordance with the rate at which the operator at such station works, and means whereby the delivery of carriers at said station may be prevented.

28. A carrier dispatch system comprising a central station having a guideway along which carriers are caused to move, a movable deflector for diverting carriers from the guideway, means for moving the deflector to and from operative position comprising a pivoted member forming a support for carriers as they are diverted from the guideway, and a manually movable locking device for retaining said pivoted member in the position to which it is moved by the weight of a carrier.

29. Apparatus of the class described comprising an inclined trough-like member pivoted to swing about a horizontal axis adjacent to its upper end, means for counterbalancing the weight of said member, a movable deflector alternatively operative to divert carriers moving in a predetermined path into the upper end of the pivoted member or to exclude them therefrom, connections between the deflector and pivoted member for transmitting movement of the latter to the former, and a manually actuable bolt for optionally locking said member against upward movement.

30. A carrier dispatch system comprising a central station desk having a belt conveyor for carriers, and means associated with the delivery end of said belt conveyor for returning carriers arriving at such end to the other end of the conveyor.

31. A carrier dispatch system comprising a central station having an elongate desk, a guideway for carriers extending along said desk, means for causing carriers to move along the guideway toward one end of the desk, and means for conveying all carriers arriving at the terminus of the guideway back to the other end of the desk.

32. A carrier dispatch system comprising a central station apparatus provided with means capable of causing an arriving carrier to move in a closed circuitous path, and means for diverting a circulating carrier from said path.

33. A carrier dispatch system comprising a carrier delivery terminal, means adapted to circulate a carrier discharged from said terminal in a closed path, and means whereby a circulating carrier may be diverted from said path.

34. A carrier dispatch system comprising a central station apparatus having means for moving an arriving carrier unidirectionally in a substantially rectilinear path, automatic means for returning a carrier arriving at one end of said path to the other, and means for diverting carriers laterally from such rectilinear path.

35. A carrier dispatch system comprising a central station having a guideway for carriers, means for causing carriers arriving at said station to move along said guideway, means for diverting carriers from said guideway, and means for conveying all carriers arriving at the terminus of said guideway back to the opposite end of the same.

36. A carrier dispatch system comprising a central station desk having a belt conveyor for moving carriers longitudinally thereof, means for diverting carriers laterally from said conveyor, and a pneumatic tube for automatically returning undiverted carriers from the terminus of the conveyor to the other end thereof.

37. A carrier dispatch system comprising a central station desk, a bank of delivery terminals arranged longitudinally of the desk, a conveyor belt for receiving all carriers delivered from said terminals and for moving them longitudinally of the desk, means for diverting carriers from said belt to operators' stations disposed at the side of the desk, and a pneumatic suction tube for returning all undiverted carriers arriving at the terminus of the conveyor to the opposite end thereof.

Signed by me at Boston, Massachusetts, this third day of August, 1922.

EDWARD R. FOWLER.